(12) United States Patent
Siebels et al.

(10) Patent No.: US 10,033,879 B1
(45) Date of Patent: Jul. 24, 2018

(54) MOBILE DEVICE USAGE OPTIMIZATION

(71) Applicant: vMOX, LLC, Rosyln Heights, NY (US)

(72) Inventors: Richard Siebels, Lebanon, PA (US); Matthew Williamson, La Porte, IN (US); David Gardner, Great Neck, NY (US)

(73) Assignee: vMOX, LLC, Roslyn Heights, NY (US)

( * ) Notice: Subject to any disclaimer, the term of this patent is extended or adjusted under 35 U.S.C. 154(b) by 0 days.

(21) Appl. No.: 15/658,292

(22) Filed: Jul. 24, 2017

(51) Int. Cl.
*H04M 15/00* (2006.01)
*H04W 24/02* (2009.01)
*H04W 8/18* (2009.01)
*G06F 17/30* (2006.01)

(52) U.S. Cl.
CPC ...... *H04M 15/58* (2013.01); *G06F 17/30076* (2013.01); *G06F 17/30321* (2013.01); *G06F 17/30569* (2013.01); *H04W 8/18* (2013.01); *H04W 24/02* (2013.01)

(58) Field of Classification Search
CPC .......... H04W 4/02; H04W 4/24; H04W 4/50; H04W 68/005; H04M 15/58; H04M 15/60; H04M 15/80; H04M 15/81
See application file for complete search history.

(56) References Cited

U.S. PATENT DOCUMENTS

| 8,422,988 B1 * | 4/2013 | Keshav | H04L 12/10 455/405 |
| 9,860,368 B2 * | 1/2018 | Aggarwal | H04M 3/2227 |
| 2011/0086610 A1 * | 4/2011 | Baldwin | H04M 15/00 455/405 |
| 2012/0302204 A1 * | 11/2012 | Gupta | H04M 15/44 455/406 |
| 2017/0201850 A1 * | 7/2017 | Raleigh | H04W 4/001 |

* cited by examiner

*Primary Examiner* — Jean Gelin
(74) *Attorney, Agent, or Firm* — Carr & Ferrell LLP

(57) ABSTRACT

Systems and methods for mobile device usage optimization are described herein. These methods can include automated mobile device usage data collection, analysis, usage optimization through device level pooling, reallocation, and/or other device plan optimizations.

19 Claims, 16 Drawing Sheets

MOBILE DEVICE USAGE OPTIMIZATION

FIELD OF THE TECHNOLOGY

The present technology relates generally to systems and methods that optimize mobile device usage through optimized mobile device usage policies and plans.

SUMMARY OF THE PRESENT TECHNOLOGY

In some embodiments the present disclosure is directed to a method that comprises: (a) obtaining mobile device data for a plurality of mobile devices in an enterprise using any of an application programming interface into a carrier portal, and screen scraping a carrier website including automated navigating the carrier website to obtain usage reports, wherein the mobile device data is collected over a period of time and is indicative of mobile device data trends; (b) normalizing the mobile device data; (c) indexing a relational dataset of mobile device data created through normalization; (d) utilizing the indexed relational dataset of mobile device data to create an optimized mobile device usage plan for the enterprise by comparing the indexed relational dataset of mobile device data compared against a library of available mobile device services; and (e) transmitting a request to a carrier through the carrier portal to selectively and automatically: (i) adjust at least one attribute of the optimized mobile device usage plan when the indexed relational dataset of mobile device data indicates that one or more of the plurality of mobile devices covered by the optimized mobile device usage plan is non-compliant with the optimized mobile device usage plan; and (ii) undertake a remediating action such that the one or more of the plurality of mobile devices is re-configured for compliance with the optimized mobile device usage plan.

In other embodiments, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method, including: obtaining mobile device data for a plurality of mobile devices in an enterprise using any of an application programming interface into a carrier portal, and screen scraping a carrier website including automated navigating the carrier website to obtain usage reports, where the mobile device data is collected over a period of time and is indicative of mobile device data trends; normalizing the mobile device data; indexing a relational dataset of mobile device data created through normalization; utilizing the indexed relational dataset of mobile device data to create an optimized mobile device usage plan for the enterprise by comparing the indexed relational dataset of mobile device data compared against a library of available mobile device services; and transmitting a request to a carrier through the carrier portal to selectively and automatically: adjust at least one attribute of the optimized mobile device usage plan when the indexed relational dataset of mobile device data indicates that one or more of the plurality of mobile devices covered by the optimized mobile device usage plan is non-compliant with the optimized mobile device usage plan; and undertake a remediating action such that the one or more of the plurality of mobile devices is re-configured for compliance with the optimized mobile device usage plan. Other embodiments of this aspect include corresponding computer systems, apparatus, and computer programs recorded on one or more computer storage devices, each configured to perform the actions of the methods.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, the present disclosure is directed, in some embodiments, to systems and methods that allow for efficient and automated mobile device optimization. In various embodiments, mobile device usage can be tracked, evaluated, and selectively adjusted to optimize the mobile device usage. This can be performed for one or a plurality of mobile devices.

In some embodiments, mobile device data is gathered for a plurality of mobile devices. These devices can belong, for example, to an enterprise of another entity. The usage of these mobile devices with respect to the enterprise can be selectively adjusted using the systems and methods disclosed herein so as to minimize any deleterious impact caused by unmonitored and/or unevaluated mobile device usage. To be sure, the number of mobile devices utilized in an enterprise can range into the thousands. Tracking usage for each of these devices and ensuring that each of these devices has an optimized usage plan and is being grouped and/or used in a most advantageous manner to minimize usage impact to the enterprise provides a complex and multi-faceted set of problems. The use of systems and methods disclosed herein can automate solutions to these problems.

Generally, the present disclosure contemplates various methods for gathering mobile device data, methods for transforming and standardizing the mobile device data gathered across a plurality of non-compatible platforms, mobile device data analytics, automatic mobile device data adjustments, as well as other methods that include auditing, reporting and savings.

These and other advantages of the present disclosure are disclosed in greater detail herein with reference to the collective drawings.

Figure 1:
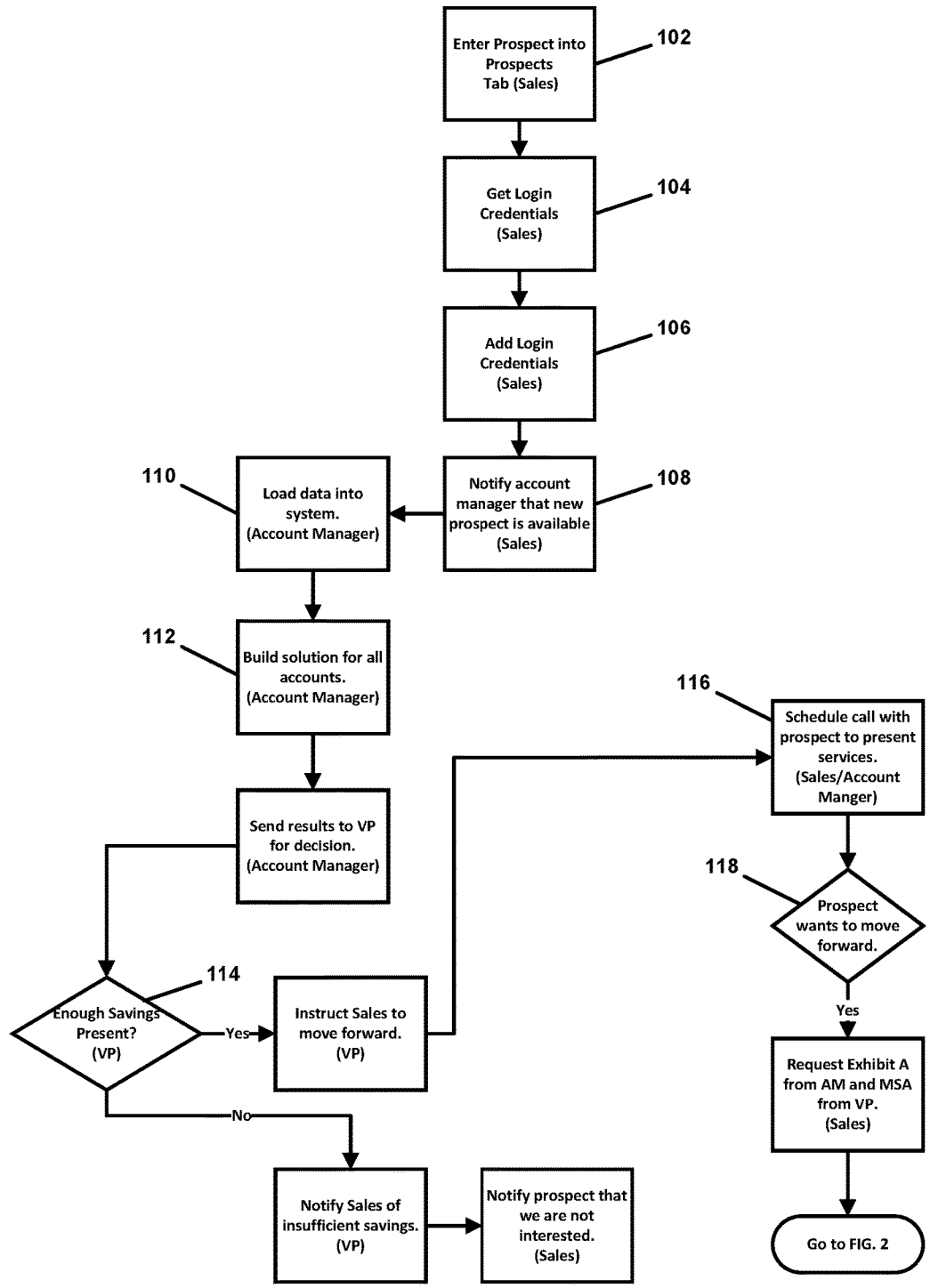
FIGS. 1 and 2 collectively illustrate a flowchart of an exemplary onboarding method that is executed in accordance with embodiments of the present disclosure.
Figure 2:
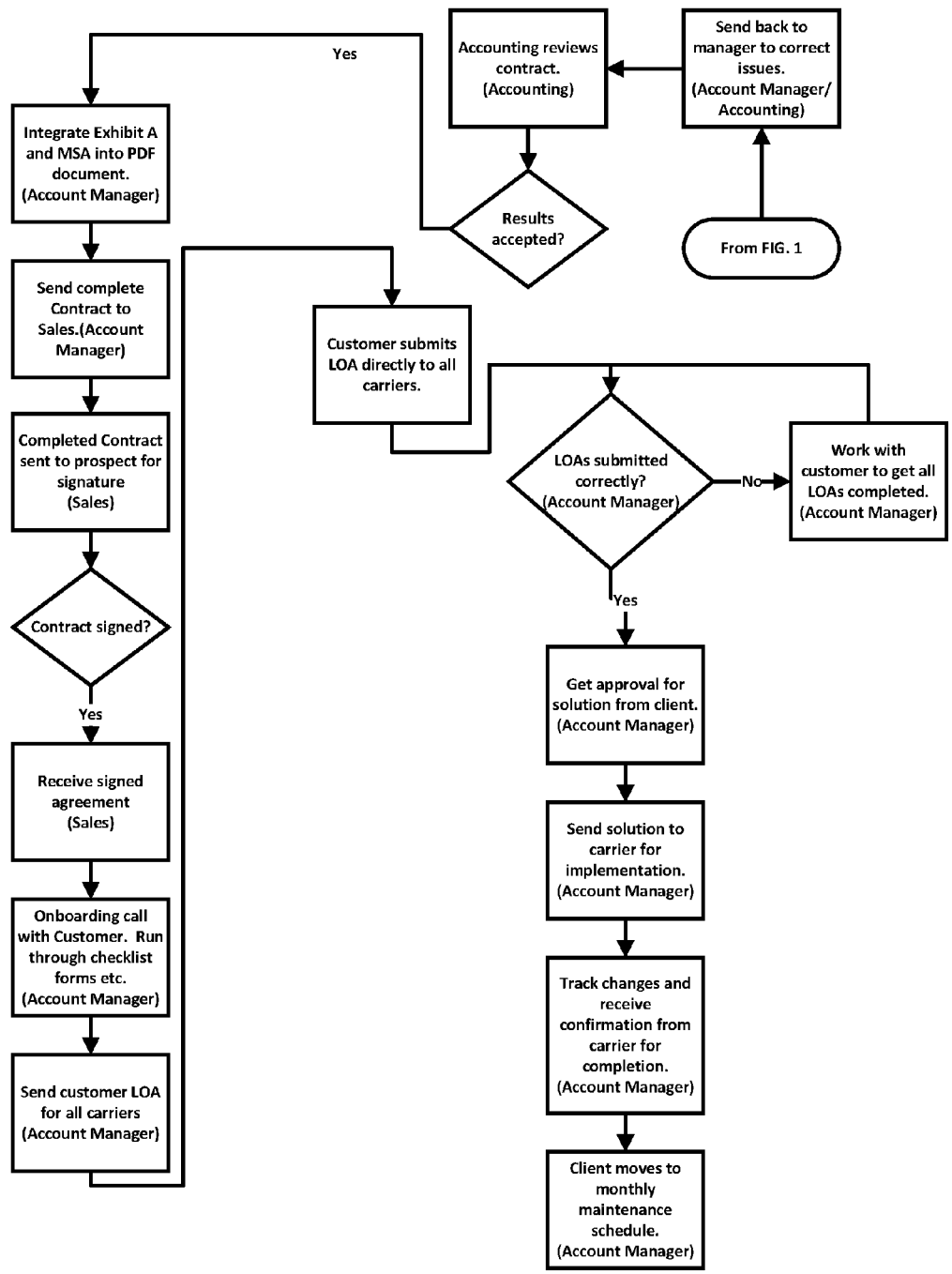
Figure 3:
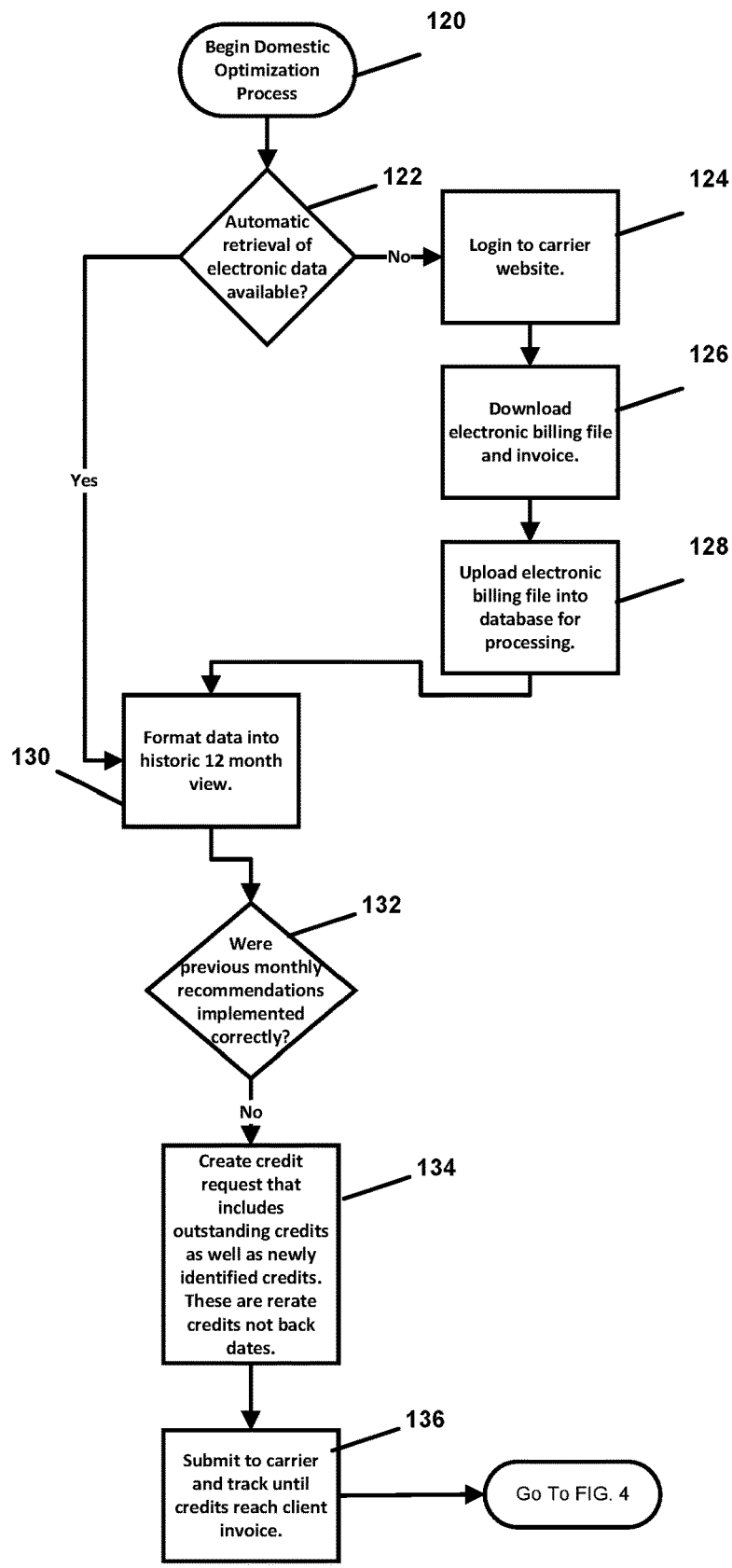
FIG. 3 collectively illustrates an example method for evaluating mobile device usage in accordance with embodiments of the present disclosure.

FIGS. 1 and 2 collectively illustrate a flowchart of an example method of the present disclosure. This method relates to an onboarding process whereby mobile device data is obtained for a plurality of mobile devices. The usage of these mobile devices results in a cumulative effect on an enterprise or organization. The method includes various algorithms that are configured to evaluate and optimize mobile device usage to reduce deleterious effects to the enterprise.

Collectively, steps 102-108 establish a login for a new account and notify an administrator that a new account is available for evaluation. Step 110 involves loading of account data, which includes information that is indicative of the enterprise, such as number of mobile devices, employees, and so forth.

In step 112, a solution for the enterprise is generated, which includes the creation of optimized mobile device data usage plans. In general, an optimized plan is created by evaluating the current or prior usage data for the enterprise, and performing a variety of optimization calculations to generate an optimized plan based on available features from a carrier(s), as well as mobile device pooling adjustments, and other remediating measures that will be described in greater detail infra.

In step 114, a determination is made whether the optimized plan, if implemented, would result in sufficient results for the enterprise. The prospective customer can be declined or accepted based on this determination. The determination can be made using an optimization threshold. The optimization threshold can be tuned to whatever feature or set of features is desired by the enterprise. For example, the enterprise may desire to reduce mobile device usage related to data consumption and any associated overage rates charged by a carrier. The optimization threshold could be defined as a percentage of data consumption that would be reduced, or a data cost savings value that is at least a certain percentage, just as examples. Steps 116-118 involve onboarding the enterprise and notifying the same.

The flow diagram illustrated in FIG. 2 involves method steps for both engaging the enterprise contractually and finalizing an optimized mobile device usage plan for the enterprise.

FIGS. 3-9 collectively illustrate an example method for evaluating mobile device usage in accordance with embodiments of the present disclosure. Generally, the method involves the prior process of onboarding an enterprise/customer. Once that process is complete, the method includes a step 120, which initiates a domestic optimization process. This domestic optimization process relates to domestic features in the current mobile device carrier plans, which relate to how the mobile devices can be used, and which features are present that can be used in a specific country where the mobile device operates, as opposed to usage of the mobile device internationally.

Step 122 involves determining if mobile device data can be obtained in an automated manner from one or more carriers. If so, this can include logging into the carrier portal in step 124, downloading usage data in step 126, and uploading the same to a plan optimization platform of the present disclosure in step 128.

As an aside, mobile device data can be obtained from a wide variety of sources, using both manual and automated process. In one embodiment, mobile device data is for a plurality of mobile devices in an enterprise using any of an application programming interface that provides access to a carrier portal. In another embodiment, the usage data can be obtained using screen scraping of a carrier website. This process can involve automated navigating of the carrier website to obtain usage reports.

It will be understood that the mobile device data is collected over a period of time and is indicative of mobile device data trends, in some embodiments. For example, usage data can be obtained for any period of time such as a month, several months, a year, or any other suitable or available period of time.

Next, the method includes step 130 where data can be formatted into a 12 month view. Again, other time periods can be utilized in accordance with the present disclosure. In step 132 a determination is made as to whether prior monthly recommendations were implemented correctly. This process effectively creates a feedback loop that determines if the enterprise had implemented a prior established optimization plan. In the event that the recommendations were not implemented correctly, the method can include a step 134 of processing credit requests (if any) and a step of submitting those credit requests with tracking in step 136.

These steps are related to situations in which the carrier fails to make a requested change. For example, a $2.99 feature is billed longer than necessary. The carrier has a human element to their implementations and in many cases, there are errors with the provisioning of plans and features at the individual line level. The system of the present disclosure will audit not only these errors from the current billing cycle but also any pending credits to determine what is outstanding with the carrier and should be resubmitted.

Figure 4:
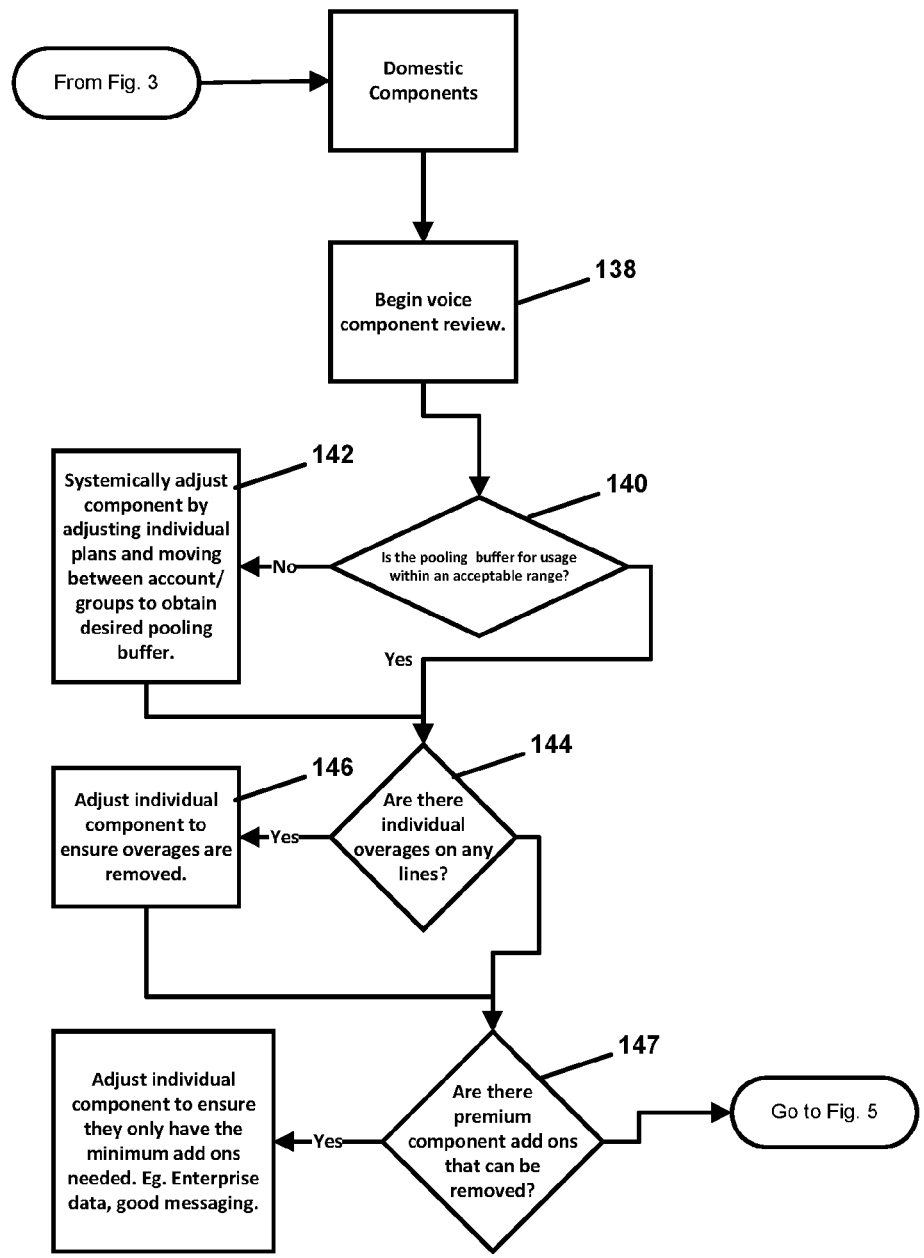
FIG. 4 depicts a flowchart of a domestic voice components analysis algorithm in accordance with embodiments of the present disclosure.

The flow of FIG. 4 depicts a domestic components analysis algorithm. In step 138, voice components of the carrier plans for the mobile devices are evaluated. In step 140, a determination is made as to whether an established pooling buffer for usage is within an acceptable range. For context, a pool can be established for a set of mobile devices in an enterprise. Some enterprises may have more than one pool. Each of these pools can be associated with a specific carrier contract or may be covered by an omnibus carrier plan for the enterprise as a whole.

Notwithstanding, a pooling buffer relates to usage within a pool of mobile devices. This step 140 allows for the system to determine if there is a usage buffer of sufficient size. For example, if a pool includes forty devices, and a usage buffer of five-hundred minutes of voice data is established, this step involves determining if those devices are, in fact, operating within that usage buffer. If not, step 142 allows for automatic adjustments of plan components and/or moving of mobile devices from a current pool to a different pool to ensure that the pooling buffer is at or below the desired level.

In step 144, a determination is made as to whether individual mobile devices are experiencing usage overages. If so, step 146 allows for individual component(s) to be selectively adjusted by the system. For example, voice services on the mobile device can be automatically restricted for a period of time.

In step 147, a determination is made as to whether premium add on components can be removed. Examples of premium components can include, but are not limited to, insurance, international features, and so forth. Each of these premium components is associated with a cost and can be selectively adjusted to optimize a plan for the enterprise.

Figure 5:
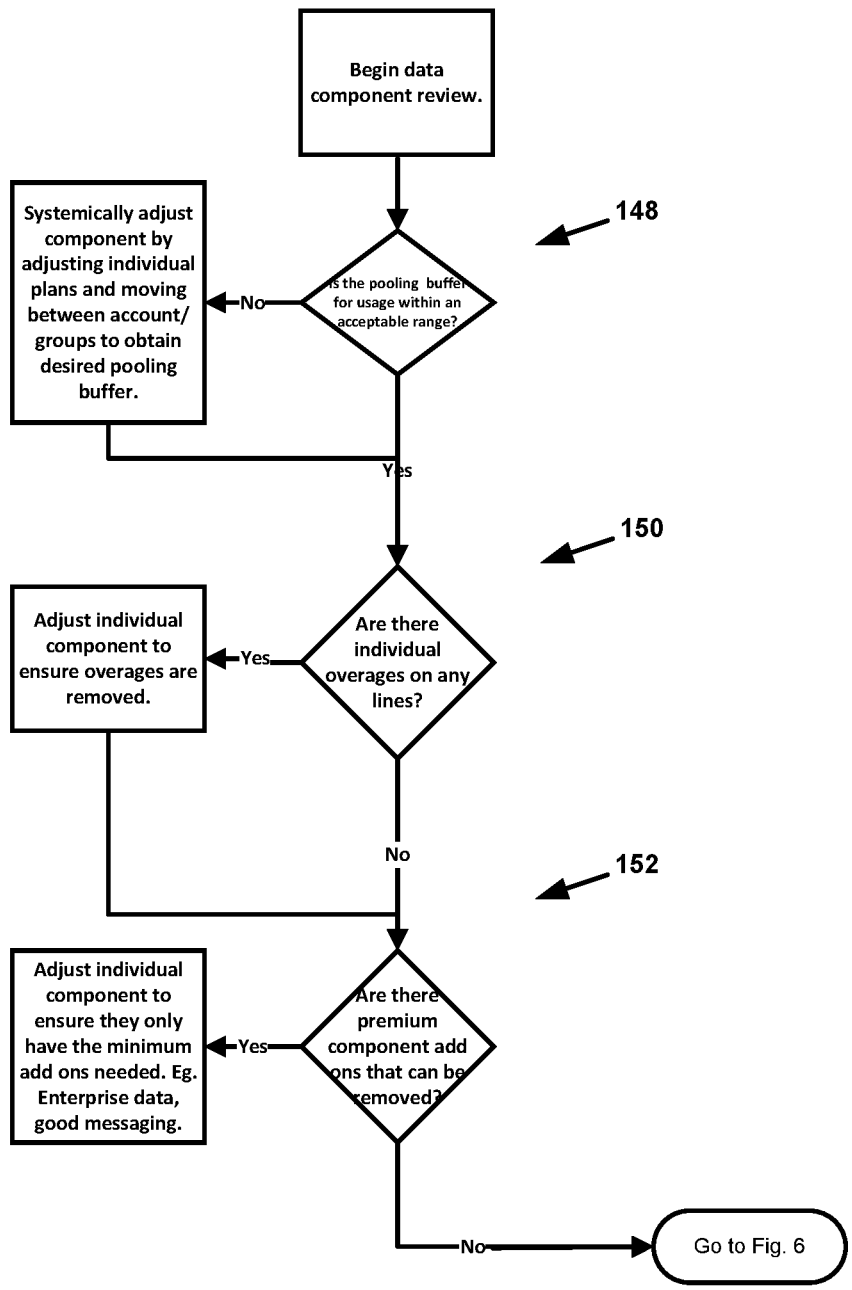
FIGS. 5 and 6 depict flowcharts related to domestic text and domestic data evaluation, respectively.
Figure 6:
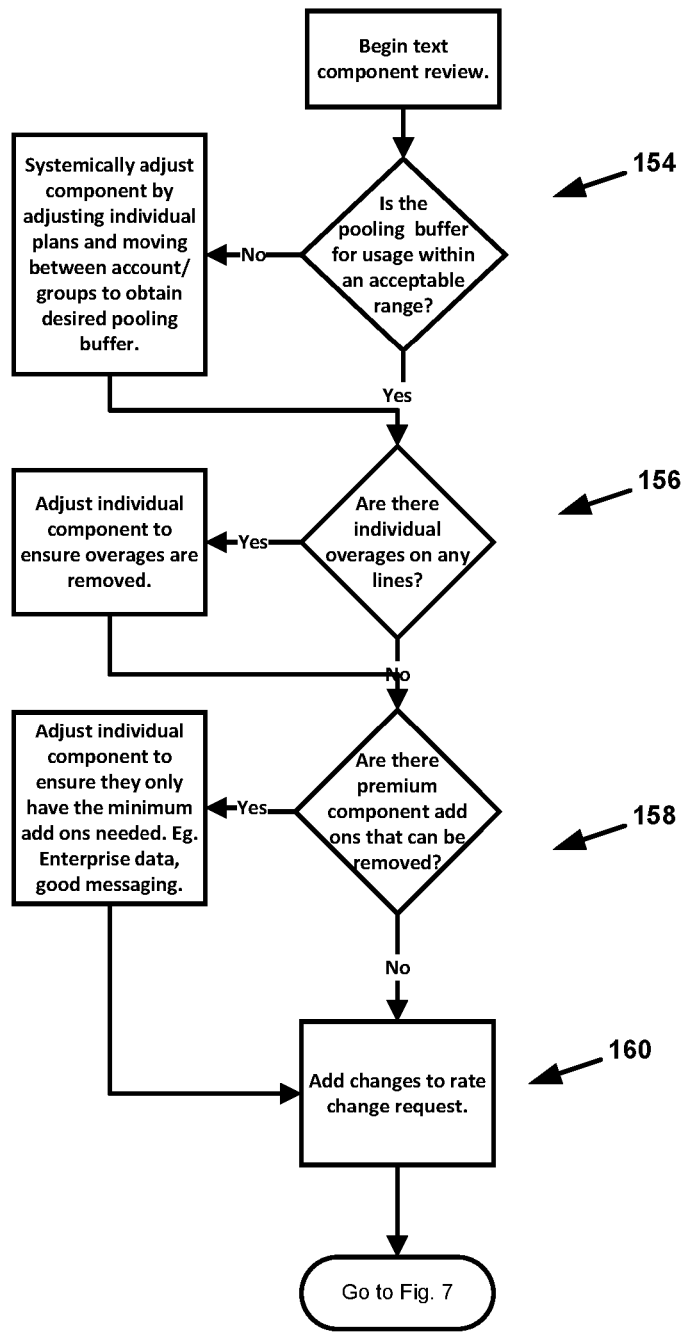

A similar analysis is performed for text components in steps 148-152, as well as text (e.g., SMS/MMS messaging) components in steps 154-158 in FIGS. 5 and 6, respectively. After step 158, a step 160 is performed where changes to any of voice, text, and/or data components are added to a rate change request.

Figure 7:
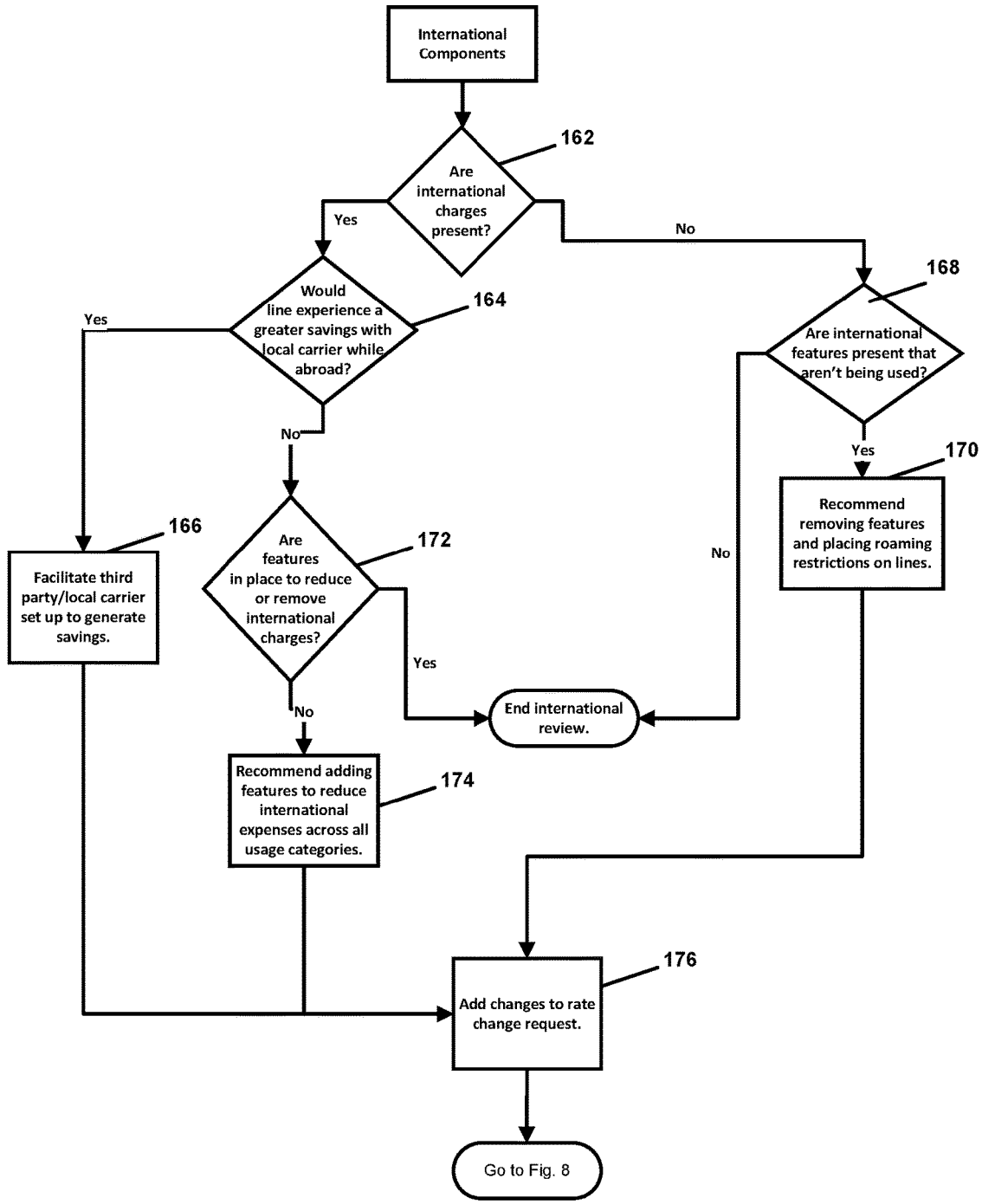
FIG. 7 depicts a flowchart of international component analysis.

In FIG. 7, a step 162 is performed to determine if international charges are present in the mobile device data. If so, a step 164 is executed to determine if the mobile device would experience a lower cost if the mobile device used a local carrier plan when traveling internationally. This can include comparing the mobile device data to a plurality of international plans that are local to the country where the international charges were assessed. If associating the mobile device with a local international plan when traveling will reduce costs, a third party/local carrier is located in step 166.

If international charges are present in the mobile device data, a step 168 is executed to determine from the mobile device data if international features present in the carrier plan are going unused. If so, these features are suggested for removal in step 170. Roaming restrictions can also be placed on the mobile device in step 170 as well to prevent the use of these removed features on an ad-hoc basis during travel.

In step 172, a determination is made as to whether features are in place relative to the mobile device carrier plan which would reduce or remove international charges. If not present, these can be added in step 174. Changes from the international review can be added to the rate change request in step 176.

Figure 8:
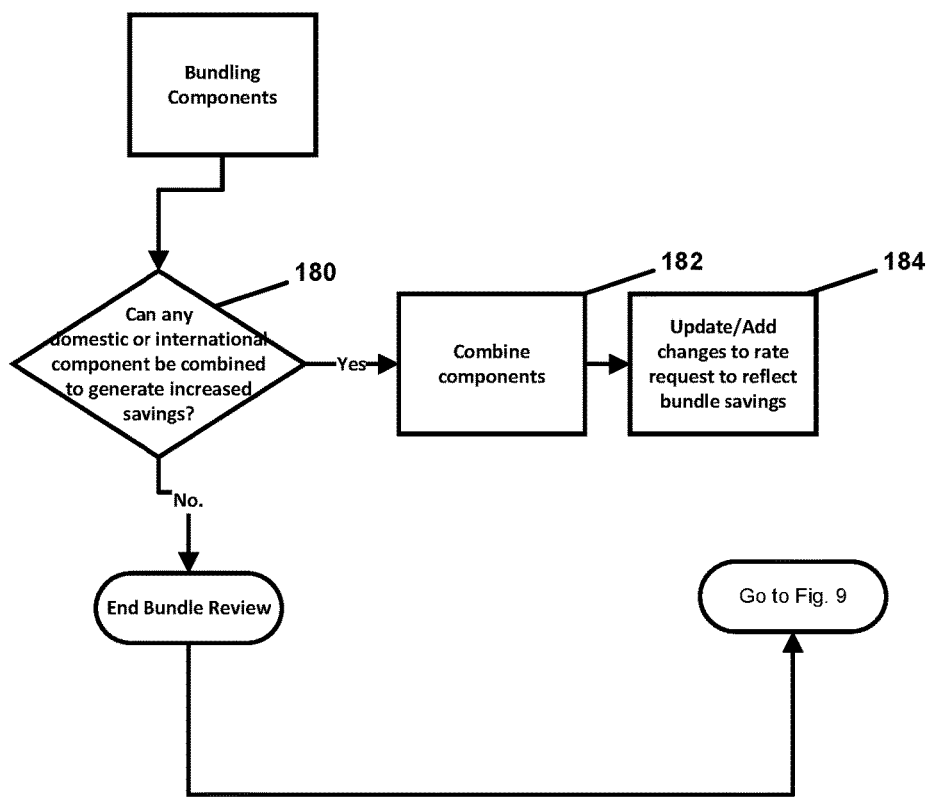
FIG. 8 depicts a flowchart of component bundling.

FIG. 8 involves reviewing bundling of components in mobile device plans. In step 180 a determination is made as to whether an international or domestic component can be added to create or increase savings with respect to a mobile device plan. If possible, the components are added in step 182 and added to the rate change request in step 184. Examples of bundle features include, but are not limited to, visual voicemail, global data features, mobile device management features, unlimited domestic features, and any combinations and/or permutations thereof.

Figure 9:
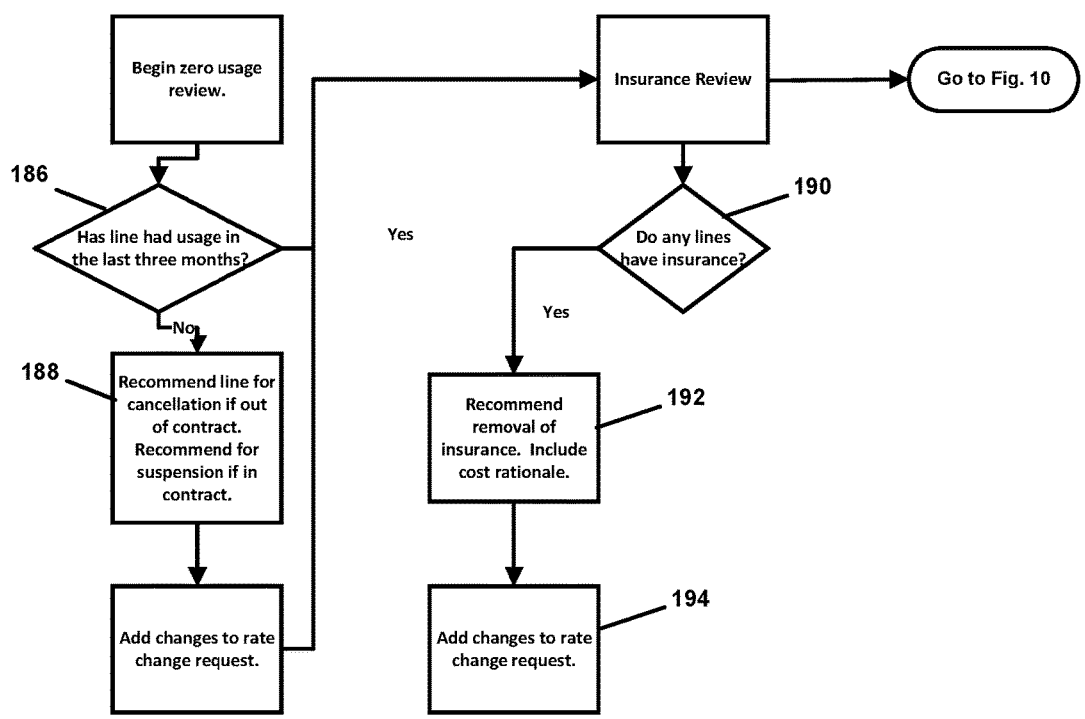
FIG. 9 depicts a flowchart of zero usage and insurance review.

In FIG. 9, a zero usage and insurance evaluation method is illustrated. This zero usage method is used to determine if a mobile device in the enterprise is going unused. For example, an employee may be issued a smartwatch in combination with their standard smartphone. The employee may rarely or never use the smart watch. In these instances, devices are identified for removal. For example, in step 186, a determination is made as to whether a mobile device has been used within the last three months (this time frame is selectable). If not, a recommendation is made to cancel the mobile device plan in step 188 and this recommendation is added to the rate change request.

In step 190, an insurance review is conducted to determine if a mobile device plan comprise insurance. If so, removal of such insurance can be suggested in step 192 and added to the rate change request in step 194. A rationale for removing insurance can be added to the request, such as a cost analysis showing that replacing the mobile device would be less costly than utilizing an insurance-based repair or replacement.

Figure 10:
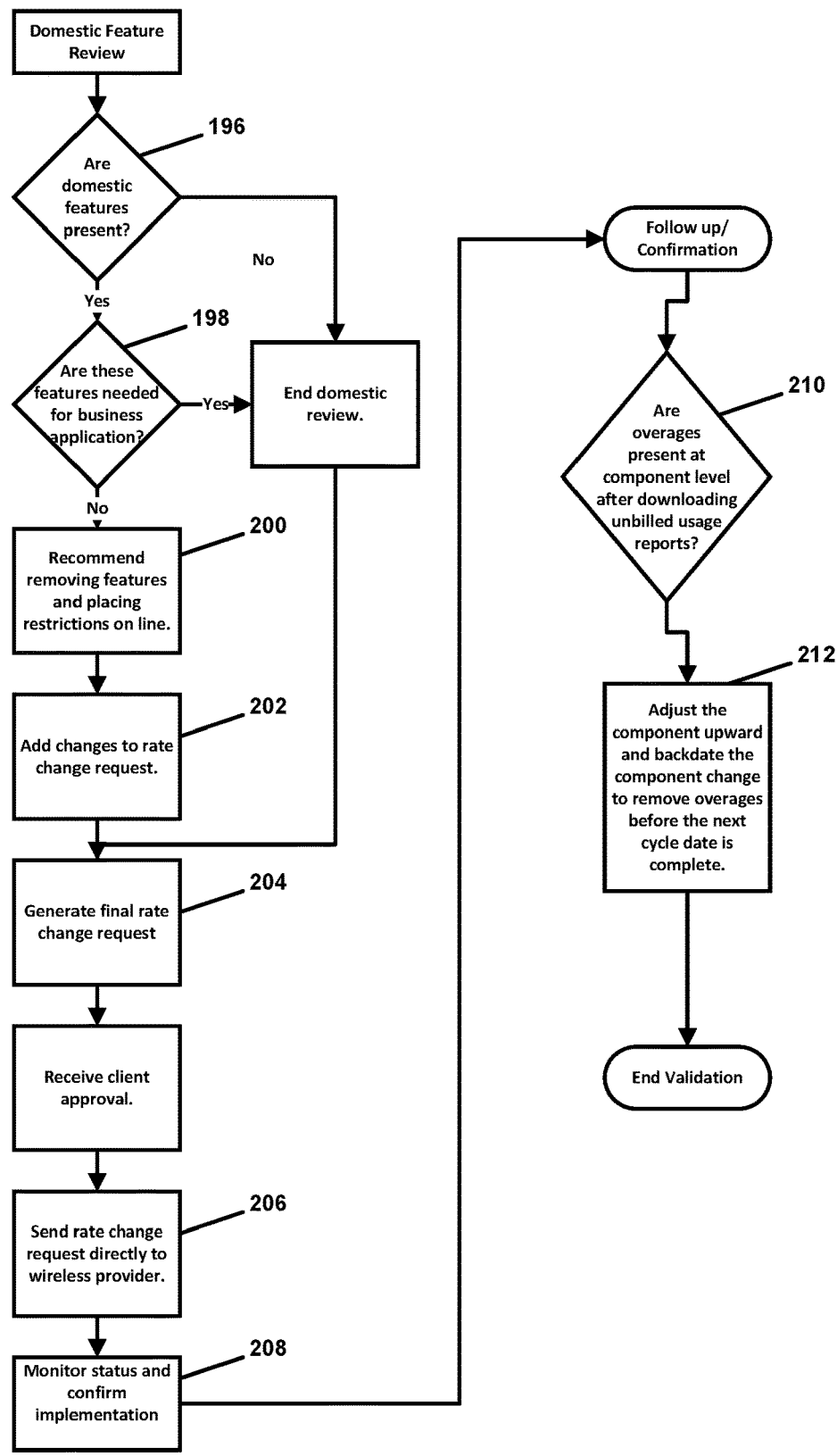
FIG. 10 depicts a flowchart of domestic feature review and rate change request finalization.

Referring now to FIG. 10, a domestic feature review is illustrated comprising a step 196 of determining if domestic features are present. If so, a determination is made as to whether these features are needed for a business application associated with the enterprise in step 198. For example, if the mobile device has a high data allotment, but the mobile device does not use data intensive enterprise applications or possesses other high data usage behaviors that are necessary for the enterprise, the method can include a step 200 of recommending the removal of the unnecessary feature(s), or the reduction of such features to an acceptable level. Again, these suggested changes can be added to the rate change request in 202. In sum, this process allows for adjusting of individual plan components of individual mobile device plans to ensure that the individual device plans only comprise minimum add-ons needed to fulfil device operational requirements for the enterprise.

A final rate change request is generated in step 204. To be sure, the final rate change request is the summation of all the selective adjustments to the mobile device features/services, plans and so forth that accumulate during the methods of FIGS. 3-10. The rate change request is then transmitted to one or more carriers in step 206 and tracked in step 208 to ensure implementation by the carrier.

A post rate change process can include a step 210 of determining if plan overages are present at a component level after the receipt unbilled usage reports. If so, step 212 includes an adjustment of a component upward and backdating of the component change to remove overages prior to a next billing cycle from the carrier.

Figure 11:
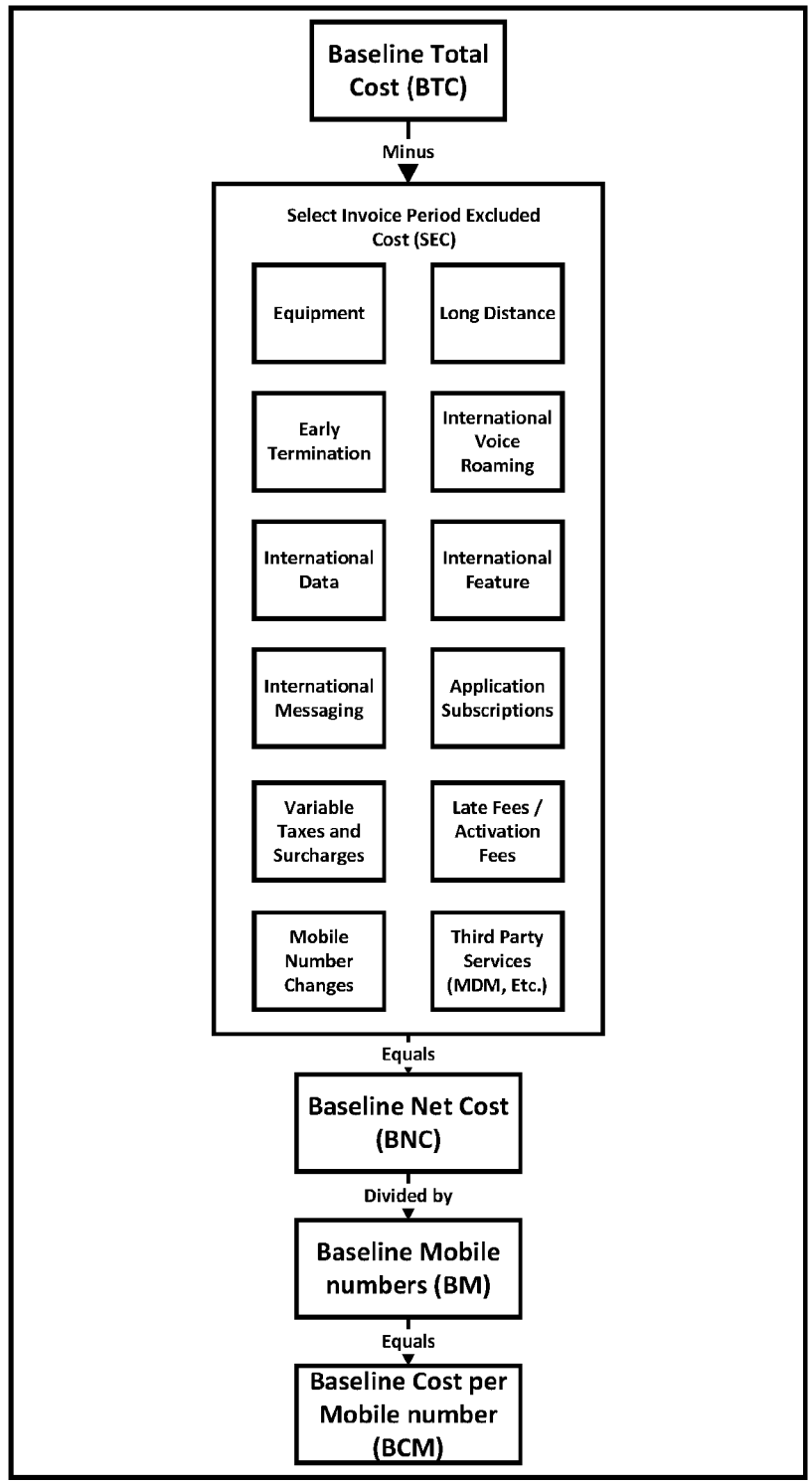
FIGS. 11-13 collectively depict methods for cost savings calculations and monthly savings per device and per all devices in an enterprise.
Figure 12:
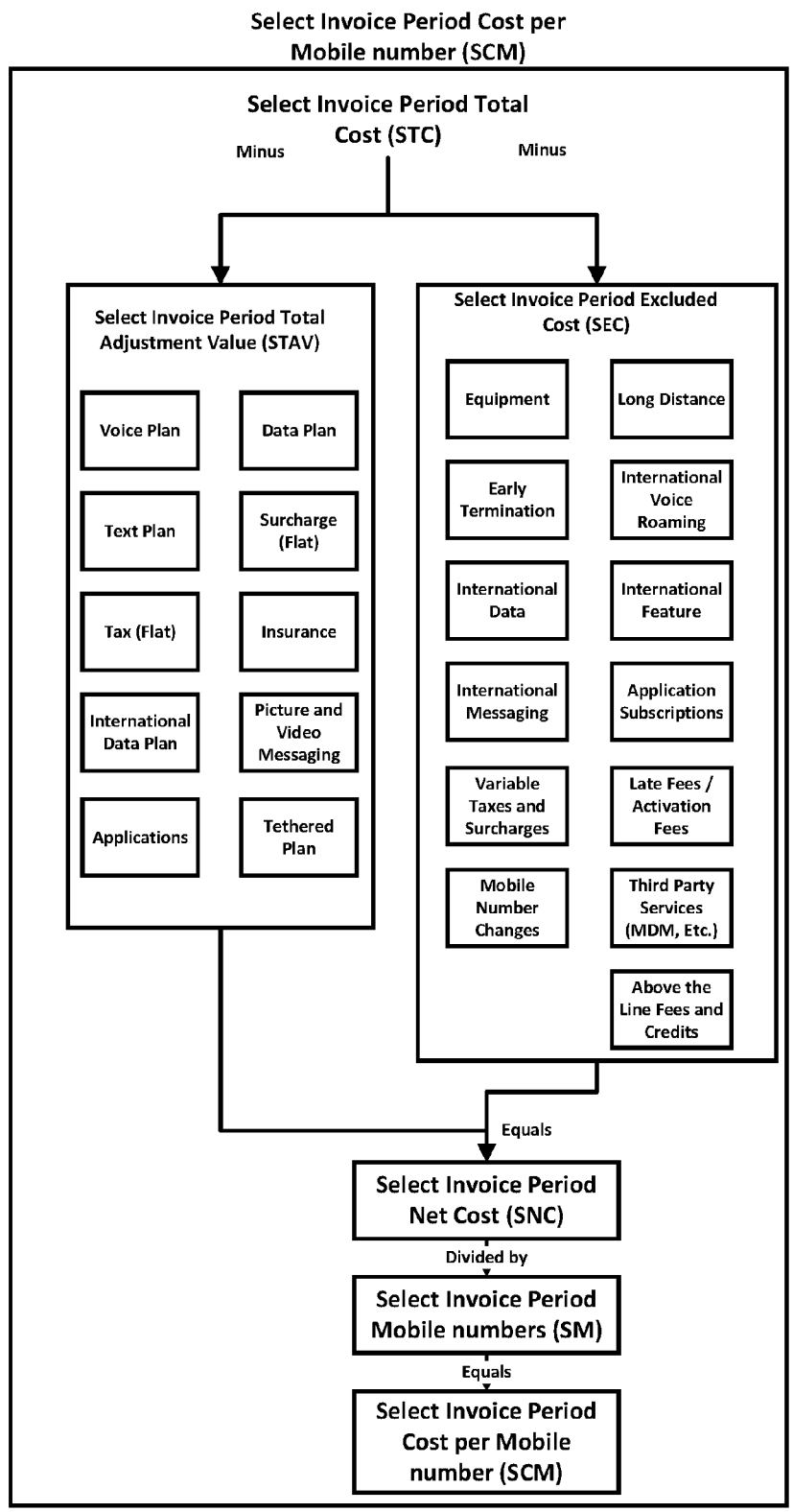
Figure 13:
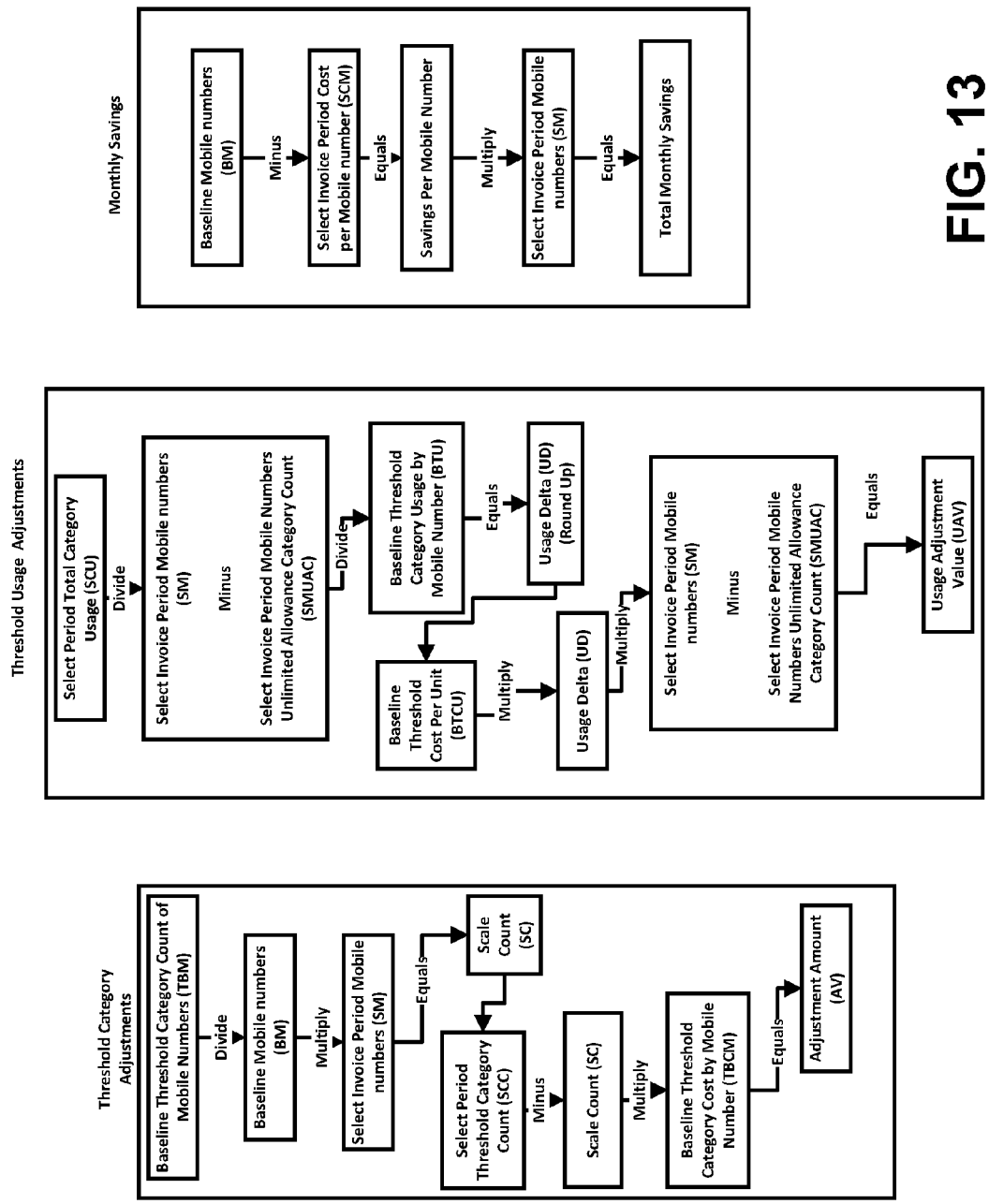

FIGS. 11-13 collectively illustrate various cost savings algorithms that can be utilized in accordance with the present disclosure. FIG. 11 illustrates the calculation of a baseline cost per mobile number method where a baseline total cost is calculated. Select invoice period excluded costs for various components of a mobile device plan such as equipment, early termination, long distance, and so forth are subtracted from the baseline total cost to derive a baseline net cost. This baseline net cost is then divided by a number of baseline mobile devices to determine a baseline cost per mobile number.

In FIG. 12, a select invoice period total cost is generated. Both a select invoice period total adjustment value and select invoice period excluded cost are then calculated and subtracted from the select invoice period total cost to determine a select invoice period net cost, which is then divided by the number of mobile devices to determine a select invoice period cost per mobile number value.

FIG. 13 illustrates various threshold adjustments and a monthly savings algorithm. A threshold adjustments calculation is performed where a baseline threshold category count of mobile numbers is divided by a baseline mobile number count, which is then multiplied by the select invoice period mobile number value calculated as in FIG. 12, to produce a scale count. A select period threshold category count is determined. The scale count is subtracted from the select period threshold category count and multiplied by a baseline threshold category cost per mobile device value to determine an adjustment amount.

A threshold usage amount calculation comprises a select period total category usage value that is divided by a select invoice period mobile number value minus a select invoice period mobile numbers unlimited allowance category count, which is then divided by a baseline threshold category usage number by mobile device to create a usage delta. The baseline threshold cost per unit value is multiplied by the usage delta, which is then multiplied by the select invoice period mobile number value minus the select invoice period mobile numbers unlimited allowance category count to create a usage adjustment value.

A monthly savings calculation includes determining a baseline number of mobile devices minus the select invoice period cost per mobile number, which yields a savings per mobile number. This savings number is multiplied by the select invoice period mobile number value to create a total monthly savings.

Figure 14:
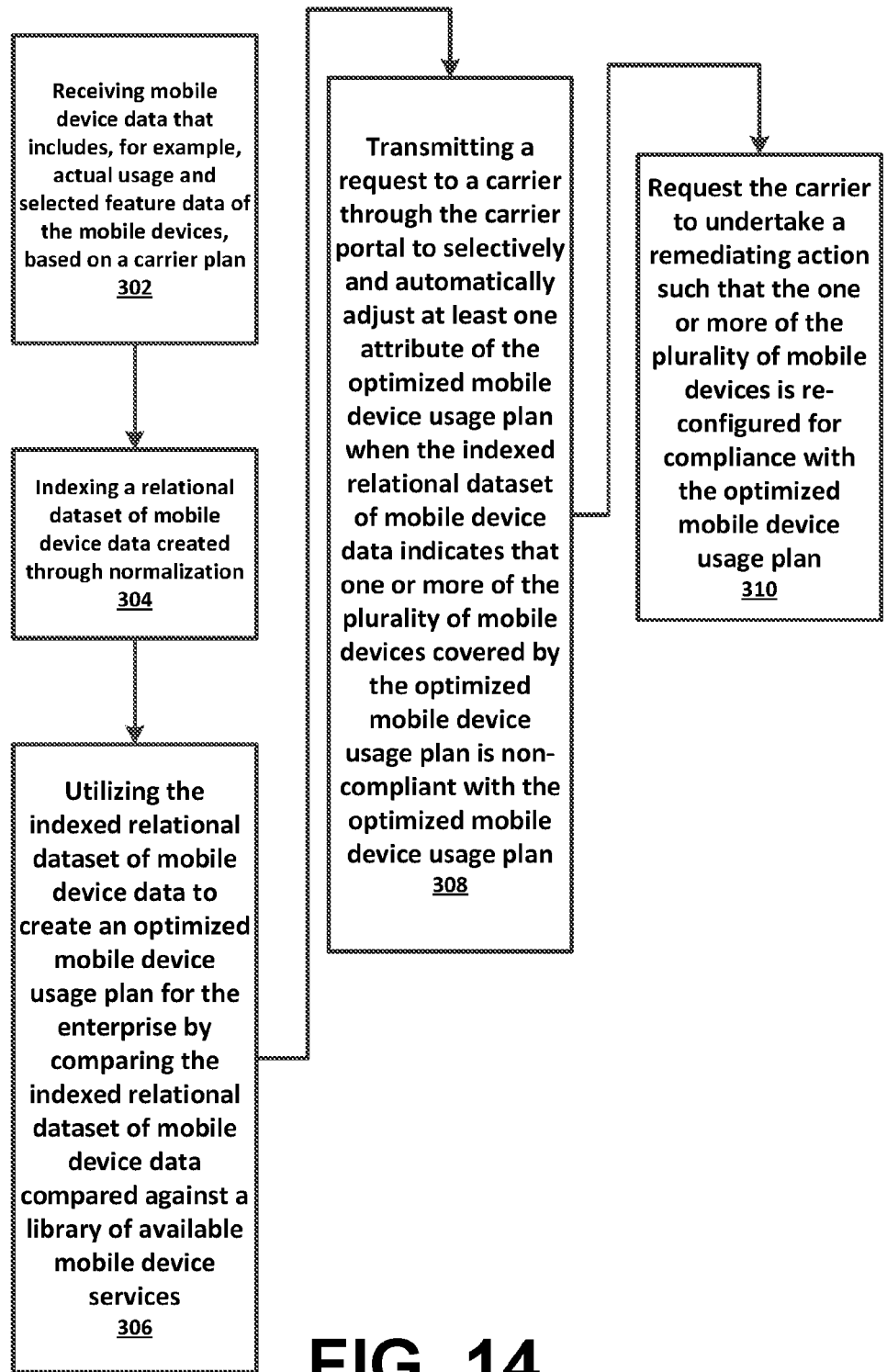
FIG. 14 illustrates an example method of the present disclosure for creating and utilizing an optimized mobile plan.

FIG. 14 illustrates an example method of the present disclosure for creating and utilizing an optimized mobile plan according to the methods and disclosure set for supra.

As mentioned above, the method can generally comprise a step 302 of receiving mobile device data that includes, for example, actual usage and selected feature data of the mobile devices, based on a carrier plan.

Figure 15:
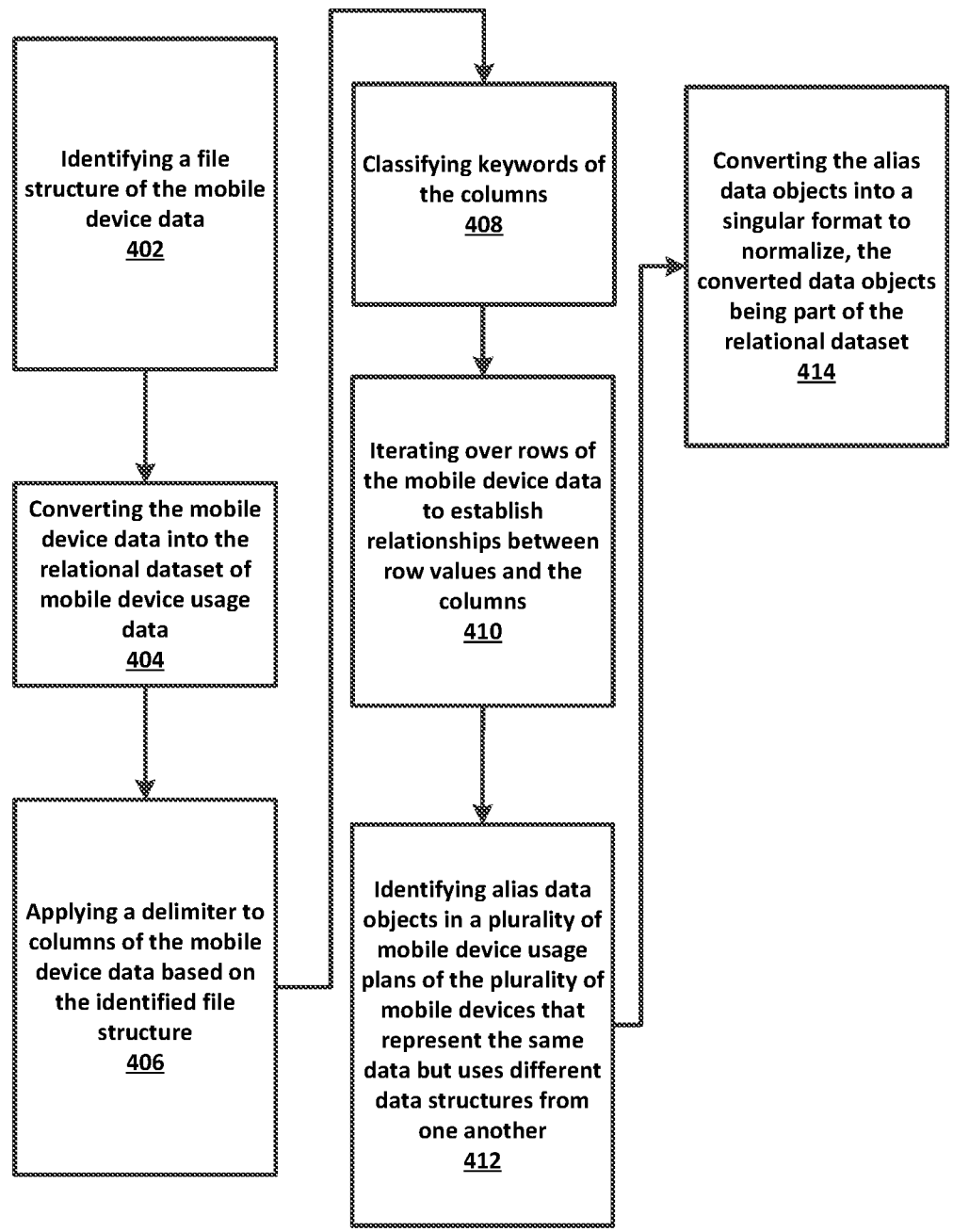
FIG. 15 illustrates an example method for normalizing aliased mobile device data.

The method also comprises a step 304 of indexing a relational dataset of mobile device data created through normalization. A detailed methodology for normalizing the data is illustrated in FIG. 15, described infra.

Next, the method includes a step 306 of utilizing the indexed relational dataset of mobile device data to create an optimized mobile device usage plan for the enterprise by comparing the indexed relational dataset of mobile device data compared against a library of available mobile device services. These available services are associated with one or more carriers that service the enterprise.

In general, the optimized mobile device usage plan is calculated by reviewing all of the current data on the mobile device with respect to voice, text, data, features both international and domestic, as well as other components that relate to the carrier plan such as overage thresholds, termination provisions, and other similar components.

The method then includes a step 308 of transmitting a request to a carrier through the carrier portal to selectively and automatically adjust at least one attribute of the optimized mobile device usage plan when the indexed relational dataset of mobile device data indicates that one or more of the plurality of mobile devices covered by the optimized mobile device usage plan is non-compliant with the optimized mobile device usage plan in step 310. In some embodiments, the method also includes a step of undertaking a remediating action such that the one or more of the plurality of mobile devices is re-configured for compliance with the optimized mobile device usage plan.

The remediating actions were referred to in the foregoing descriptions as recommendations or suggestions that were included in a rate change request.

In some embodiments a remediating action comprises reallocating the one or more of the plurality of mobile devices from a first pool of mobile devices to a second pool of mobile devices, so as to prevent data overage of the first pool of devices. In this instance the at least one attribute is a data overage threshold. For example, if a mobile device in first pool is determined to be approaching or over an allotment of data based on their carrier plan, the mobile device can be reallocated to a pool of devices where data usage is relatively low. Thus, in this instance, the overage would only cost the enterprise if the pool itself went over the data overage threshold, not the individual mobile device in the pool of devices.

In another example, a remediating action comprises adjusting at least one aspect of the optimized mobile device usage plan for the one or more of the plurality of mobile devices to prevent the one or more of the plurality of mobile devices from being non-compliant. For example, this can include removing or adding any domestic or international component, the result of which would create a cost savings if implemented.

As noted above, a remediating action can comprise determining if the one or more of the plurality of mobile devices has not been used within a specified period of time and then flagging the one or more of the plurality of mobile devices for termination if the one or more of the plurality of mobile devices has not been used within the specified period of time. In the examples provided above, the threshold was three months, although other time frames can be utilized.

In another example a remediating action comprises selectively adjusting mobile device services that are not part of a carrier plan for the one or more of the plurality of mobile devices to prevent the one or more of the plurality of mobile devices from being non-compliant with the optimized mobile device usage plan. Example services include domestic charges, international charges, insurance, voice charges, data charges, and any combinations and permutations thereof.

The present disclosure also contemplates the use of auditing and reporting features. For example, the method can comprise a step 314 of auditing the mobile device data after undertaking the remediating action to audit compliance of the one or more of the plurality of mobile devices with the optimized mobile device usage plan, as well as a step 316 of generating and transmitting a report that is indicative of the auditing compliance.

It will be understood that the auditing compliance can comprises an efficacy evaluation that comprises analysis of historical costs per mobile phone number for each of the plurality of mobile devices, current costs per mobile phone number for each of the plurality of mobile devices, total category adjustment amounts for each of the plurality of mobile devices, and total monthly savings for each of the plurality of mobile devices, or any combinations and permutations thereof.

FIG. 15 illustrates a flow diagram of a method for normalizing mobile device data. To be sure, the format and/or content of mobile device data obtained across various portals or sources may have formatting that is inconsistent with one another. For example, a first carrier may report their mobile device data in a format that is inconsistent with a format used by a second carrier. This could include using different field names for data entries and so forth. Thus, the method can include a step 402 of identifying a file structure of the mobile device data, as well as a step 404 of converting the mobile device data into the relational dataset of mobile device usage data. It will be understood that converting the mobile device data into the relational dataset of mobile device data further includes a step 406 of applying a delimiter to columns of the mobile device data based on the identified file structure, as well as a step 408 of classifying keywords of the columns, and then a step 410 of iterating over rows of the mobile device data to establish relationships between row values and the columns.

Advantageously, this part of normalization described above allows for the detection and further normalization of what is referred to as alias data objects.

Thus, the method can include a step 412 of identifying alias data objects in a plurality of mobile device usage plans of the plurality of mobile devices that represent the same data but uses different data structures from one another. Next, the method can include a step 414 of converting the alias data objects into a singular format to normalize, the converted data objects being part of the relational dataset.

Figure 16:
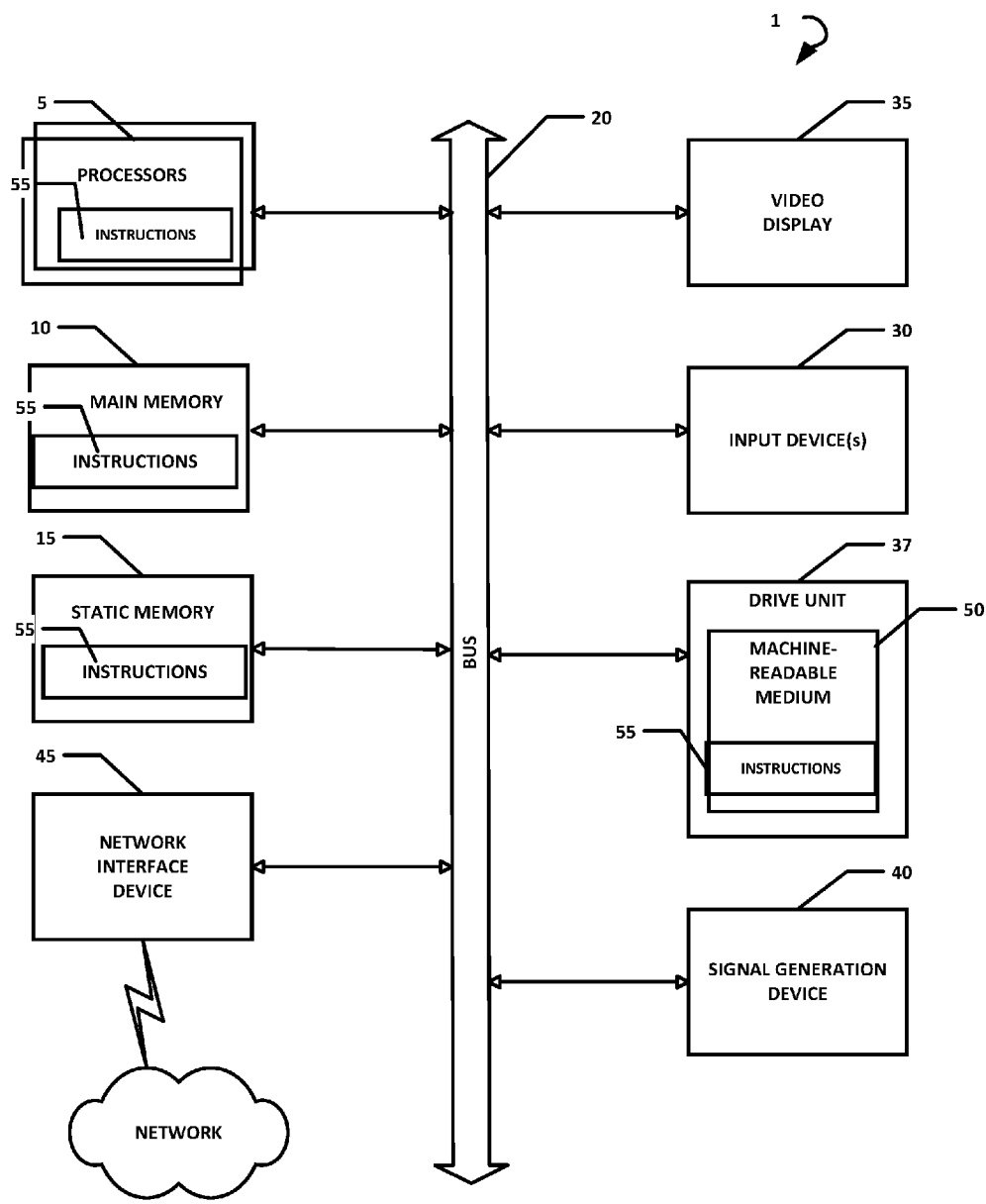
FIG. 16 illustrates an exemplary computing system that may be used to implement embodiments according to the present technology.

FIG. 16 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/ or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
    obtaining mobile device data for a plurality of mobile devices in an enterprise using any of an application programming interface into a carrier portal, and screen scraping a carrier website including automated navigating the carrier website to obtain usage reports, the mobile device data being collected over a period of time and being indicative of mobile device data trends;
    normalizing the mobile device data;
    indexing a relational dataset of mobile device data created through normalization;
    utilizing the indexed relational dataset of mobile device data to create an optimized mobile device usage plan for the enterprise by comparing the indexed relational dataset of mobile device data compared against a library of available mobile device services; and
    transmitting a request to a carrier through the carrier portal to selectively and automatically:
    adjust at least one attribute of the optimized mobile device usage plan when the indexed relational dataset of mobile device data indicates that one or more of the plurality of mobile devices covered by the optimized mobile device usage plan is non-compliant with the optimized mobile device usage plan; and
    undertake a remediating action such that the one or more of the plurality of mobile devices is re-configured for compliance with the optimized mobile device usage plan.

2. The method according to claim 1, wherein normalizing the mobile device data comprises:
    identifying a file structure of the mobile device data; and
    converting the mobile device data into the relational dataset of mobile device data, wherein converting the mobile device data into the relational dataset of mobile device data further comprises:
    applying a delimiter to columns of the mobile device data based on the identified file structure;
    classifying keywords of the columns; and
    iterating over rows of the mobile device data to establish relationships between row values and the columns.

3. The method according to claim 2, wherein converting the mobile device data into the relational dataset of mobile device data further comprises:
    identifying alias data objects in a plurality of mobile device usage plans of the plurality of mobile devices that represent the same data but uses different data structures from one another; and
    converting the alias data objects into a singular format to normalize, the converted alias data objects being part of the relational dataset of mobile device data.

4. The method according to claim 1, wherein the remediating action comprises reallocating the one or more of the plurality of mobile devices from a first pool of mobile devices to a second pool of mobile devices, so as to prevent data overage of the first pool of devices, the at least one attribute being a data overage threshold.

5. The method according to claim 1, wherein the remediating action comprises adjusting at least one aspect of the optimized mobile device usage plan for the one or more of the plurality of mobile devices to prevent the one or more of the plurality of mobile devices from being non-compliant.

6. The method according to claim 1, wherein the remediating action comprises removing at least one aspect of the optimized mobile device usage plan for the one or more of the plurality of mobile devices to prevent the one or more of the plurality of mobile devices from being non-compliant.

7. The method according to claim 1, wherein the remediating action comprises:
    determining if the one or more of the plurality of mobile devices has not been used within a specified period of time; and
    flagging the one or more of the plurality of mobile devices for termination if the one or more of the plurality of mobile devices has not been used within the specified period of time.

8. The method according to claim 1, wherein the remediating action comprises selectively adjusting mobile device services that are not part of a carrier plan for the one or more of the plurality of mobile devices to prevent the one or more of the plurality of mobile devices from being non-compliant with the optimized mobile device usage plan.

9. The method according to claim 8, wherein the mobile device services comprise any of domestic charges, international charges, insurance, voice charges, data charges, and any combinations and permutations thereof.

10. The method according to claim 1, wherein the indexed relational dataset of mobile device data is obtained for a specified time period.

11. The method according to claim 1, further comprising creating a credit request that includes outstanding credits as well as newly identified credits for the plurality of mobile devices.

12. The method according to claim 11, further comprising:
    transmitting the credit request to a mobile carrier; and
    tracking the credit request until fulfilled by the mobile carrier.

13. The method according to claim 1, wherein the mobile device data comprises voice charges and data charges, wherein these charges are processed by:
    determining if a usage pooling buffer is within range;
    determining if overage charges are present; and
    determining if premium features are being used.

14. The method according to claim 13, further comprising:
    systemically adjusting a component by adjusting individual device plans of the one or more of the plurality of mobile devices; and
    moving the one or more of the plurality of mobile devices between accounts or groups to obtain a desired usage pooling buffer.

15. The method according to claim 14, further comprising adjusting individual components to ensure overages do not occur.

16. The method according to claim 15, further comprising adjusting individual components of individual device plans to ensure that the individual device plans only comprise minimum add-ons needed to fulfil device operational requirements for the enterprise.

17. The method according to claim 1, further comprising auditing the mobile device data after undertaking the remediating action to audit compliance of the one or more of the plurality of mobile devices with the optimized mobile device usage plan.

18. The method according to claim 17, further comprising generating and transmitting a report that is indicative of the auditing compliance.

19. The method according to claim 18, wherein the auditing compliance comprises an efficacy evaluation that comprises analysis of historical costs per mobile phone number for each of the plurality of mobile devices, current costs per mobile phone number for each of the plurality of mobile devices, total category adjustment amounts for each of the plurality of mobile devices, and total monthly savings for each of the plurality of mobile devices.

* * * * *

UNITED STATES PATENT AND TRADEMARK OFFICE
CERTIFICATE OF CORRECTION

| | | |
|---|---|---|
| PATENT NO. | : 10,033,879 B1 | Page 1 of 1 |
| APPLICATION NO. | : 15/658292 | |
| DATED | : July 24, 2018 | |
| INVENTOR(S) | : Richard Siebels, Matthew Williamson and David Gardner | |

It is certified that error appears in the above-identified patent and that said Letters Patent is hereby corrected as shown below:

On the Title Page

After (71) Applicant: vMOX, LLC:
"Rosyln Heights" should be "Roslyn Heights".

Signed and Sealed this
Sixteenth Day of April, 2024

*Katherine Kelly Vidal*

Katherine Kelly Vidal
*Director of the United States Patent and Trademark Office*